United States Patent [19]

McPhee

[11] 3,893,468

[45] July 8, 1975

[54] CLAMP FOR FLEXIBLE TUBE AND METHOD OF REGULATING FLOW IN SUCH TUBE

[75] Inventor: Carles J. McPhee, Sylmar, Calif.

[73] Assignee: American Hospital Supply Corporation, Evanston, Ill.

[22] Filed: June 22, 1970

[21] Appl. No.: 47,958

[52] U.S. Cl. .................................. 137/1; 251/6
[51] Int. Cl. ............................................ F16k 7/06
[58] Field of Search ............................ 251/4–10; 24/126 B, 136 A; 128/214

[56] References Cited
UNITED STATES PATENTS

| | | | |
|---|---|---|---|
| 1,959,074 | 5/1934 | Bloxsom | 251/6 |
| 2,595,511 | 5/1952 | Butler | 251/6 |
| 3,102,710 | 9/1963 | Dresden | 251/9 |
| 3,135,259 | 6/1964 | Evans | 251/6 X |
| 3,189,038 | 6/1965 | Von Pechmann | 251/6 X |
| 3,477,454 | 11/1969 | Fields | 251/4 X |
| 3,477,686 | 11/1969 | Engelsher et al. | 251/10 |
| 3,685,787 | 8/1972 | Adelberg | 251/6 |

FOREIGN PATENTS OR APPLICATIONS

| | | | |
|---|---|---|---|
| 185,107 | 9/1963 | Sweden | 24/126 B |

Primary Examiner—Martin P. Schwadron
Assistant Examiner—Richard Gerard
Attorney, Agent, or Firm—Millen, Raptes & White

[57] ABSTRACT

A medical tubing clamp with a movable roller in a U-shaped body to progressively pinch a plastic tube to control flow rates of blood or parenteral solution delivered to a patient. The clamp has a greatly improved resistance to flow rate "drift" because the clamp pinches the tube in a very special way. The clamp externally squeezes opposite side portions of the tube to a greater extent than a longitudinal central portion of the tube when partially collapsing the tube. The clamp does this with a pair of ledge surfaces either on the clamp body or roller and these ledge surfaces are separated by a groove that receives the longitudinal central portion of the tube. In this manner plastic cold flow distortion or relaxation with time at the highly stressed opposite side portions of the tube is isolated from the longitudinal central portion allowing the clamp to more closely hold its initial flow rate setting.

19 Claims, 17 Drawing Figures

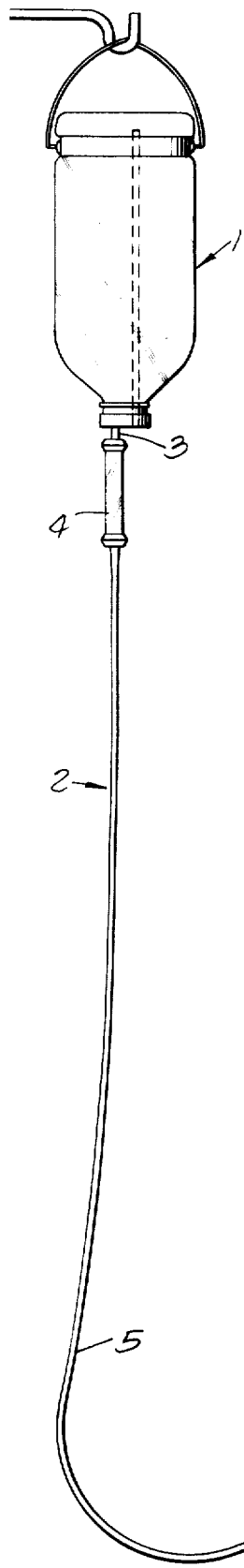
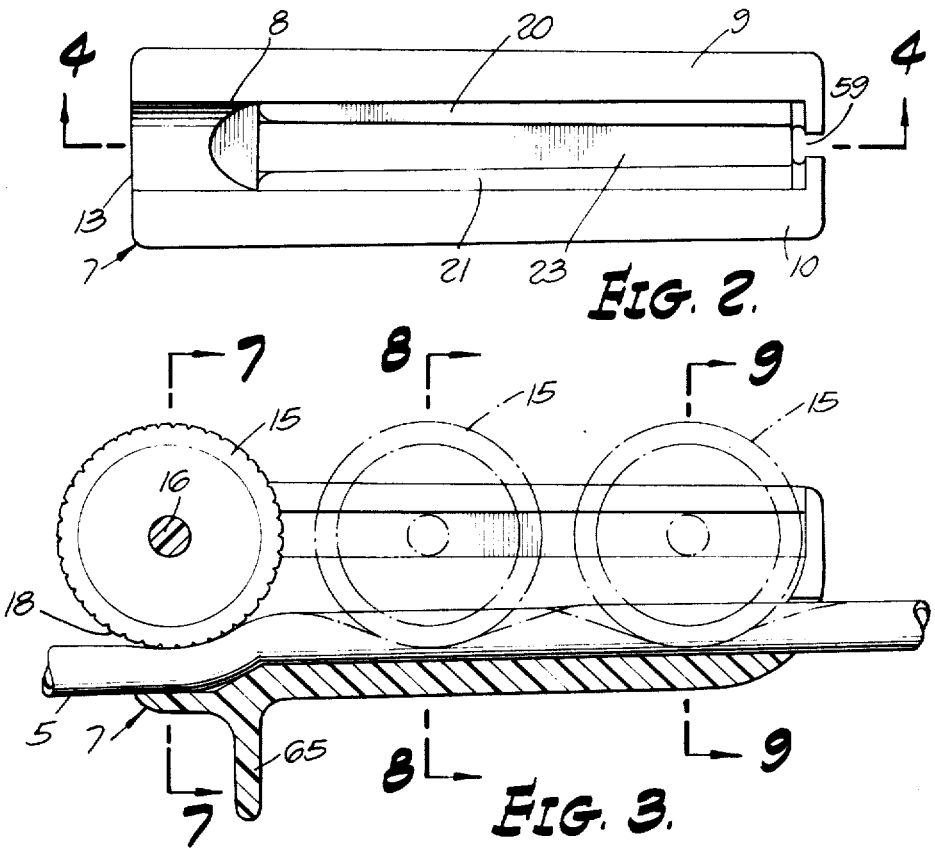
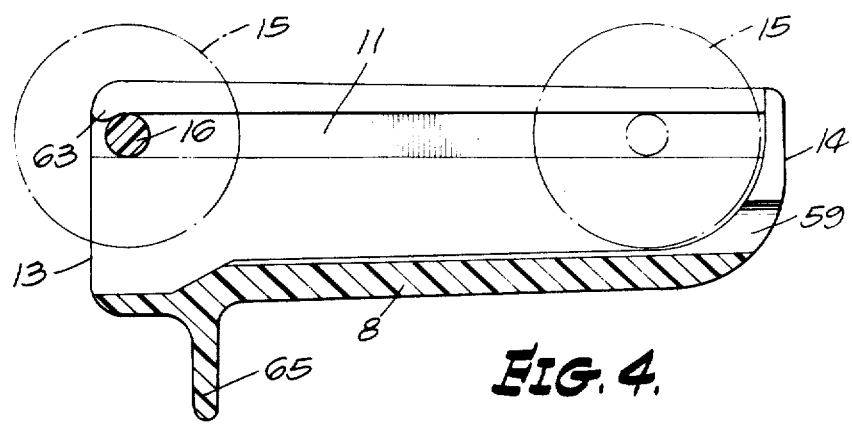
FIG. 1. FIG. 2. FIG. 3. FIG. 4.
INVENTOR
CHARLES J. MCPHEE
BY Larry N. Barger
ATTORNEY INVENTOR
CHARLES J. MCPHEE
BY Larry N. Barger
ATTORNEY

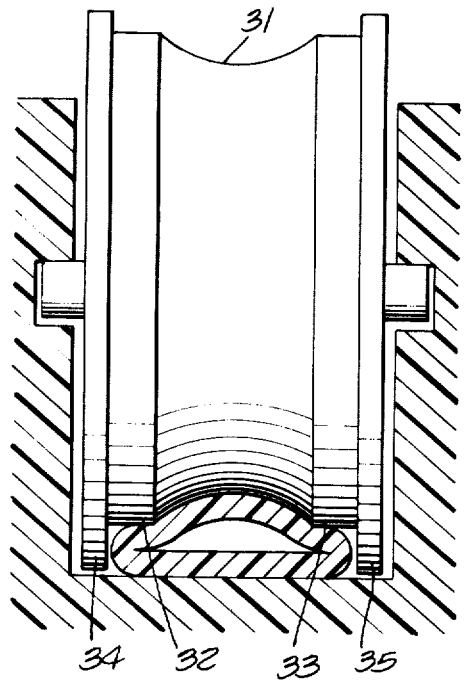
FIG. 10.
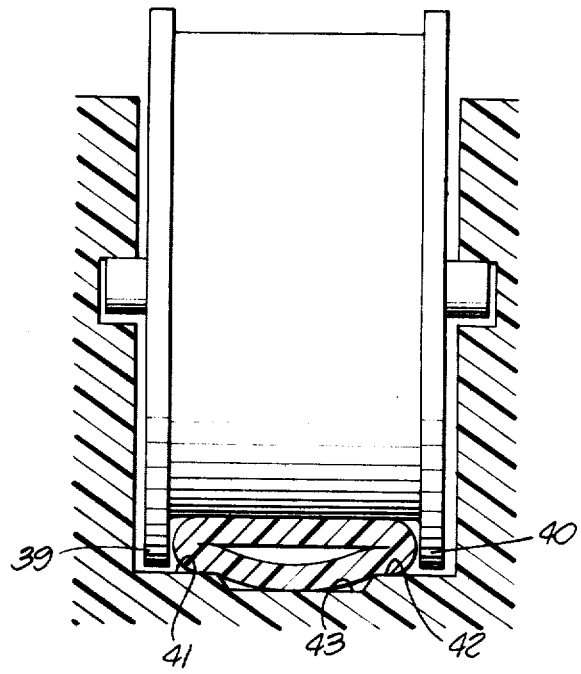
FIG. 11.
FIG. 13.
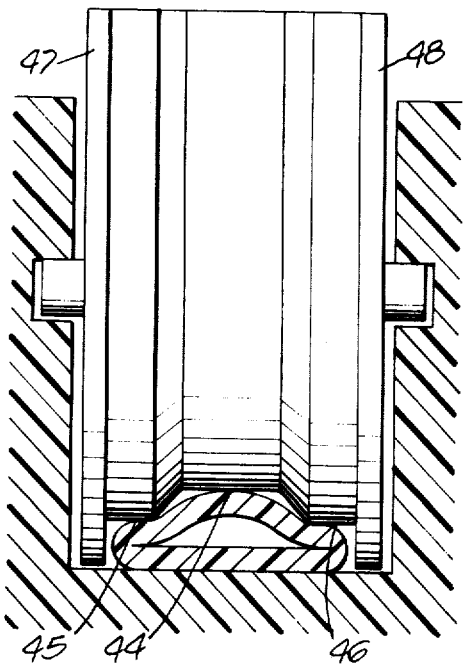
FIG. 12.
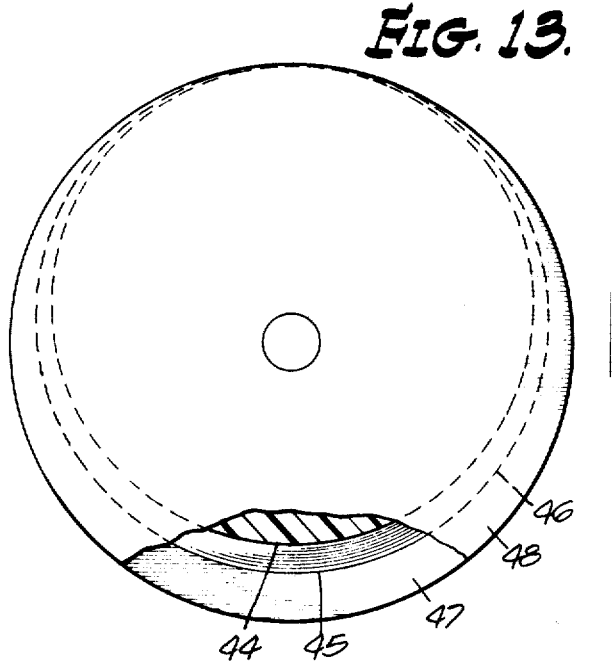
INVENTOR
CHARLES J. McPHEE
BY Larry N. Barger
ATTORNEY INVENTOR
CHARLES J. McPHEE
BY
Larry N. Barger
ATTORNEY

CLAMP FOR FLEXIBLE TUBE AND METHOD OF REGULATING FLOW IN SUCH TUBE

This invention relates to a clamp for regulating flow rates through a flexible plastic tube used in a medical administration set to deliver blood or parenteral solution to a patient's vein from a suspended bottle or bag.

For several decades it has been known to control flow rates through a flexible medical tube by partially collapsing a section of the tube to form a restriction. Various types of clamps have been used for this purpose — screw clamps, roller clamps, transverse slide clamps with V-shaped slots, etc. However, these previous clamps had a definite problem in that the flow rate through the tube drifted or changed after an initial setting of the clamp. Some of these clamps changed 50% or more in the first hour after their initial setting. The problems of the drifting clamps are widely known in hospitals. To try to compensate for this problem, nurses were often instructed to reset the clamps at periodic intervals to be sure the patients were receiving the blood or solution at the rate prescribed by their physicians. These clamps that had to be continually reset gave uneven flow rates to the patient and created an additional burden on the nurses.

People have been trying for many years to satisfy the long felt need for a flow control clamp that would hold a relatively stable flow rate and still be inexpensive enough to be sold to the hospitals in sterile condition and discarded after use on only one patient. Such single use discardable clamps greatly reduce the chance of cross contamination between patients.

The "drifting clamp" problem that has been with us for such a long time is complicated by many factors contributing to the drift. One of the most important of these factors is the so called cold flow distortion of plastic tubing when under stress. A section of the tube held in a partially collapsed condition by the clamp tends to relax with time causing its shape, and hence its flow restricting characteristics, to change.

Another factor contributing to the large drifts in flow rates is the very small clamp movement perpendicular to the tube that is available to control the normal range of flow rates in a medical administration set. An administration set has a flexible plastic tube with an upper end for connecting to a bottle of blood or parenteral solution, and a lower end for connecting to a hypodermic needle used to puncture the patient's vein. For smooth gravity drain of blood or solution through the tube from the bottle to the needle the plastic tube is made with a bore that is about 2 to 10 times larger than a passage through the needle. A typical plastic tube in an administration set might have a 0.120 inch inside diameter and the needles used with this tube might have cannulae with bore diameters ranging from 0.012 inch (25 gauge) to 0.060 inch (15 gauge). Thus the plastic tube must be almost completely collapsed before it will further restrict and regulate liquid flow through the needle. When in this condition, a perpendicular pinching movement of approximately 0.003 inch on the tube example given will change a flow rate of 500 ml/hr. to 10 ml/hr. For these and other complex reasons, the drifting clamp problem has continued to plague hospitals.

I have overcome this problem by providing a clamp that can hold a relatively stable flow rate within about 10% of its initial setting and still be economically disposed of after use on only one patient. My clamp does this by partially collapsing a section of the tube in a very special way to control flow rates. The clamp has a U-shaped body and a roller that progressively pinches the tube against the body as in conventional roller clamps. However, in my clamp either the clamp body or roller has a pair of ledge surfaces laterally separated by a groove. These ledge surfaces pinch opposite side portions of the tube to a greater extent than a longitudinal central portion of the tube received in the groove. This causes most of the liquid to flow through a central portion of the tube that is under less stress and tends to cold flow less than the highly stressed opposite side portions of the tube.

The clamp that reduces this flow rate drift has the roller held to the clamp body by either of two embodiments of roller retention systems that will be described in detail later.

Perhaps my invention can be better understood with reference to the attached drawings in which:

FIG. 1 is a side elevational view of the clamp being used on a flexible plastic tube of a medical administration set;

FIG. 2 is a top plan view of the body only of my clamp showing the groove and ledge surfaces in the floor of the clamp body;

FIG. 3 is a cross sectional view taken from a side of the clamp and showing the clamp pinching the tube and three different positions of the roller to demonstrate the shape of the pinched tube at these clamp settings;

FIG. 4 is a sectional view taken along line 4—4 of FIG. 2 showing the roller in dotted line at opposite extremes of its movement in the body and the roller is held to the body by a first embodiment of the roller retention system;

Figure 7:
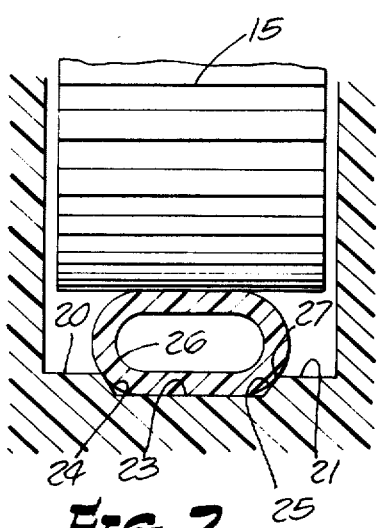
Figure 8:
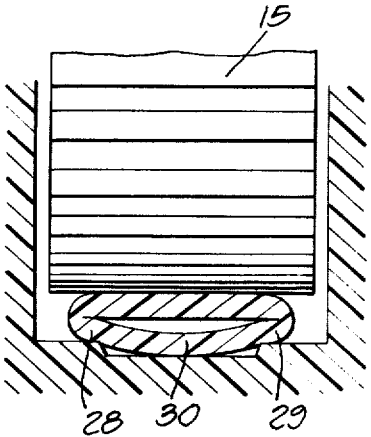
Figure 9:
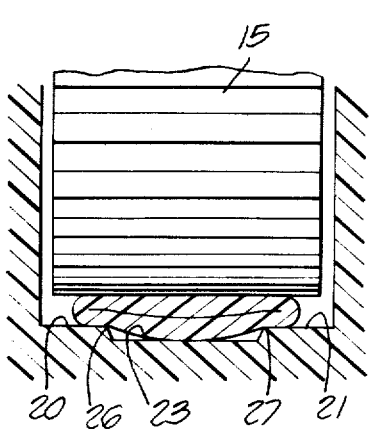
Figure 15:
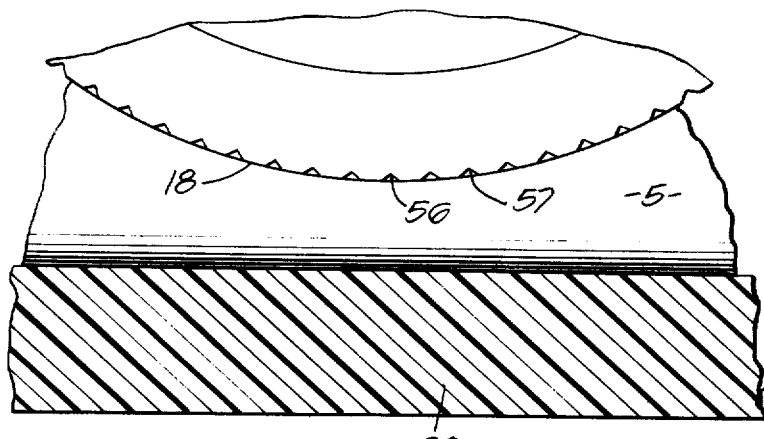
Figure 14:
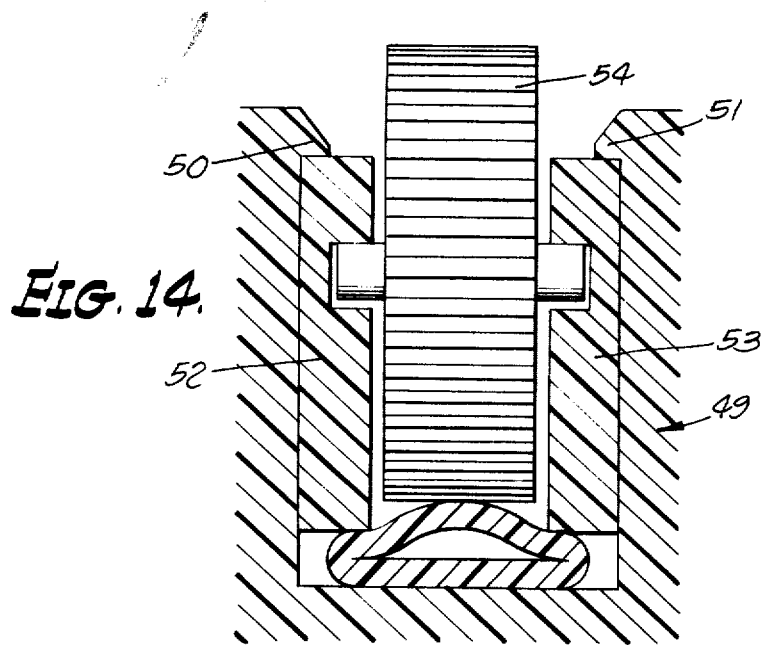
Figure 16:
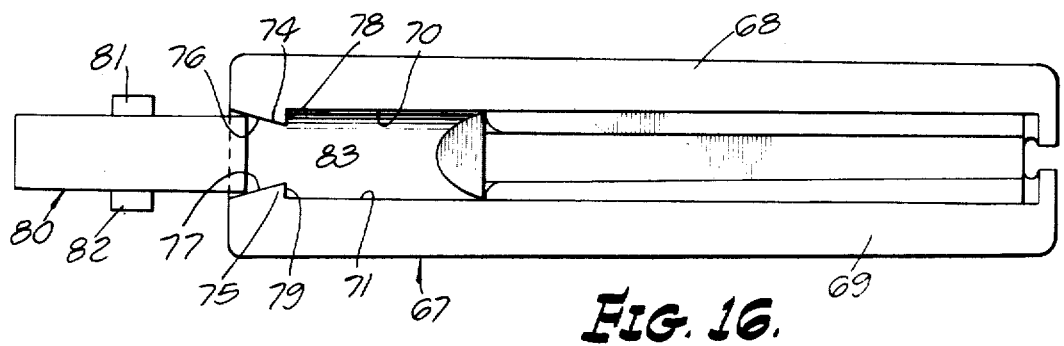
Figure 17:
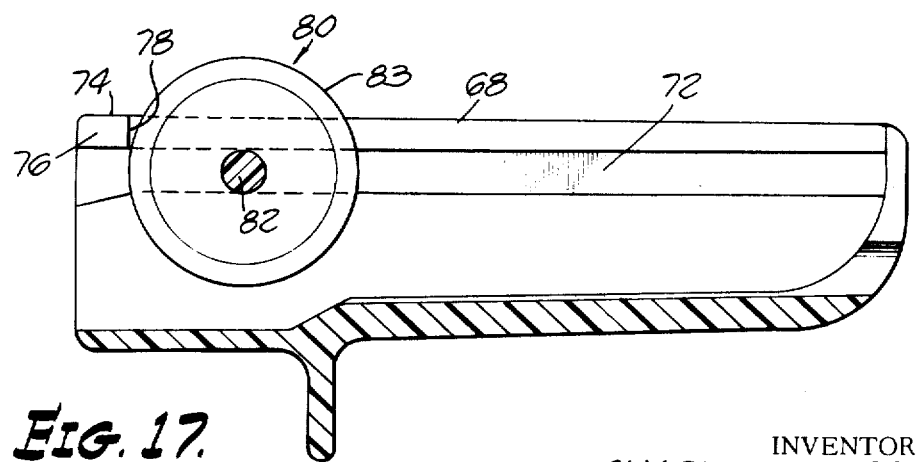

FIGS. 7, 8, and 9 are enlarged fragmentary views taken along lines 7—7, 8—8, and 9—9 respectively of FIG. 3 and illustrate the cross sectional shape of the pinched tube at these clamp settings;

FIGS. 10, 11, and 12 are enlarged sectional views similar to FIG. 8, but showing second, third and fourth embodiments of my clamp;

FIG. 13 is a side elevational view of the roller shown in FIG. 12;

FIG. 14 is an enlarged sectional view similar to FIG. 8, but illustrating a fifth embodiment of the clamp structure;

FIG. 15 is a greatly enlarged fragmentary section of the roller of FIGS. 3 or 14 showing the surface features of the roller;

FIG. 16 is a top plan view of a roller clamp with a second embodiment of the roller retention system; and FIG. 17 is a cross sectional view from a side of the clamp in FIG. 16, with the roller assembled to the clamp body.

Moving on to a detailed description of these drawings we have in FIG. 1 a typical medical administration set being used to drain parenteral solution from a suspended bottle 1. The administration set 2 includes a hollow spike 3 at its upper end connecting to an outlet of the bottle. As the solution from the bottle flows through the spike it then enters a drip chamber 4 where the flow rate is determined by counting the drops per minute entering this chamber. Solution in the chamber drains through a flexible plastic tube 5 that has a roller clamp 6 attached to the tube and then through a hypodermic needle connected to the lower end of this flexible tube. This needle is in the patient's vein during administration.

The arrangement of the medical administration set in FIG. 1 is conventional and this is where the problem of the drifting flow rates comes in. In starting the liquid administration a nurse would move a roller of clamp 6 back and forth until she zeroed in on the correct flow rate as determined by counting the drip rate in chamber 4. After this initial setting, the nurse would leave the room to go about her other nursing duties. When she returned an hour later she might find that an initial setting of 40 ml/hr., for example, had now decreased to only 20 ml/hr. Although generally the drift would decrease the flow rate, occasionally it would increase the rate to perhaps 60 ml/hr. The flow rate drift of previous clamps was greater at settings near the lower end of the 10 ml/hr. to 500 ml/hr. range because the plastic tube was under greater stress at slow flow rates. These slow flow rates, 40 ml/hr. for example, were often used on infants and children where flow rates could be very critical. Some physicians, fully recognizing this problem of flow rate drift, required that the clamps be reset one hour after their initial setting.

I have overcome this problem by providing a clamp that drastically reduces the flow rate drift. In tests my clamp has been shown to hold a relatively constant initial flow rate with very little drift. After an initial setting of the clamp at any flow rate in the range of 10 ml/hr. to 500 ml/hr. it will generally drift less than 10% from this initial setting. This is estimated to be a five fold improvement over previous clamps of the tube squeezing type. Many physicians believe that with this small flow rate drift it is unneccessary to reset the clamp after an initial setting.

My clamp performs this feat by a very special method in which it squeezes the tube. In the first embodiment of my invention, shown in FIGS. 1 to 9, the clamp has two parts. There is a U-shaped clamp body 7 with a floor element 8 and side members 9 and 10 forming a longitudinal channel through the clamp body. The side members have guide slots 11 and 12 that converge toward the floor element 8 as they proceed from a rear end 13 to a front end 14 of the clamp body. A roller 15 has a pair of axles that fit in these guide slots. One axle is shown as 16. As the roller moves back and forth along the clamp body a cylindrical surface 18 of the roller progressively collapses and uncollapses a section of tube 5 to control flow rate through the administration set. In its unpinched condition the flexible tube 5 is generally cylindrical with a bore (0.120 inch inside diameter for example) and keeps a rigid cylindrical hypodermic needle cannula 19 with a bore (0.023 inch for example, 21 gauge) fully supplied with liquid. With such relative difference in the size of the bores in the flexible tube and metal cannula, it is seen that the flexible tube must be pinched nearly closed before its bore is sufficiently reduced in size to further restrict and regulate flow through the cannula bore.

Figure 5:
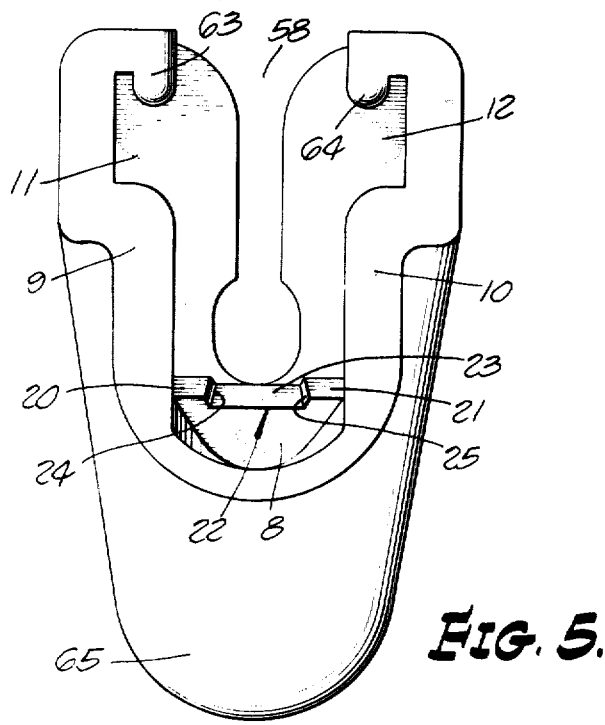
FIG. 5 is a left end view of FIG. 4 with roller and tube removed.

The clamp of my invention has a special structure for maintaining the flexible plastic tube in a nearly collasped condition with very little drift or change in flow rate. This structure is shown in the first embodiment of the invention as a pair of coplanar ledge surfaces 20 and 21 in the clamp body's floor element 8, and these ledge surfaces are laterally separated by a groove 22. Defining this groove is a groove surface with a bottom surface 23, and two side surfaces 24 and 25 that extend between this bottom surface and inner edges 26 and 27 of the ledge surfaces. I have found that a groove between 0.004 and 0.020 inch deep and between 0.115 and 0.175 inch wide works very well with plastic tubing having an I.D. of about 0.120 inch and an O.D. Of about 0.165 inch. Preferably the inner edges 26 and 27 of the ledge surfaces converge toward each other as they proceed forwardly in the clamp as shown in FIGS. 2 and 5. The inner edges 26 and 27 are shown as sharp edges, but these could be radiused to make molding them easier, and such edges would still function to control flow rate drift as described.

As best seen in FIG. 8, the roller 15 squeezes the tube against this floor structure and opposite side portions 28 and 29 of the tube are pinched to a greater extent than a longitudinal central portion 30 of the tube received in groove 22. When in this partially collapsed condition, the opposite side portions of the tube each comprise at least 10% of the transverse dimension of the tube. This method of pinching the flexible plastic tube keeps substantially all of the liquid at flow rates of 10 ml/hr. to 500 ml/hr. flowing through the tube's longitudinal central portion, because in this range the opposite side portions of the tube are substantially closed. The longitudinal central portion of the tube is under less stress and tends to cold flow less than the opposite side portions which are extremely stressed because they have nearly 180° short radius bends. Because they carry little if any liquid, any cold flow distortion at these opposite side portions will have a reduced effect on the total flow rate through the tube.

The range through which the roller travels along the clamp body to control flow rate is shown in FIGS. 7, 8, and 9. In FIG. 7 the clamp is at its rearmost position and has a very slight depressing effect on the tube which does not reduce the full flow through the much smaller cannula bore. The purpose for this slight interference between the roller and tube when the clamp is in its full open position is simply to keep the clamp at a particular position on the tube. However, if it is desired to move the clamp to a different location a nurse can easily slide it along the tube with the roller in the position shown in FIG. 7. For instance, the clamp in FIG. 1 could be moved closer to the bottle if desired. FIG. 8 has the roller at an intermediate position in the clamp body for liquid administration through the set. The FIG. 9 roller position has the tube completely closed off at a generally straight transverse seal extending between opposite side portions of the tube. The shallow groove does not prevent total shut off because under firm clamping pressure in FIG. 9 the tube will slightly deform around the inner edges 26 and 27 of the ledge surfaces.

In the first embodiment discussed above the ledge and groove surfaces were in the floor element of the clamp body. FIG. 10 shows a second embodiment where the groove surface 31 and ledge surfaces 32 and 33 are on the roller. There are also a pair of side flanges 34 and 35 on the roller that roll along the clamp floor to give good control to the roller and hold the central portion of the tube in the roller groove. As shown here the flanges are shorter at the top of the roller than at the bottom and are eccentric with groove and ledge surfaces. Thus, as the roller turns the ledge and groove surfaces can progress toward the floor. Alternatively, the side flanges 34 and 35 could be concentric with the ledge and groove surfaces with the flanges as short on the bottom of the roller as on the top in FIG. 10. These small flanges would not interfere with the clamping action as the roller was moved closer to the floor to decrease the flow rate.

The third embodiment of FIG. 11 has flanges 39 and 40 similar to those of FIG. 10. However, the ledge surfaces 41 and 42 and groove surface 43 are in the floor element.

FIG. 12 has a fourth embodiment with the roller similar to that of FIG. 10, but the groove surface 44 has a different profile. In addition the groove surface 44, ledge surfaces 45 and 46, and flanges 47, 48 are all tangential as shown at the top of the roller. FIG. 13 shows this tangential relationship in dotted line.

In the fifth and final embodiment of FIG. 14, the clamp body has a U-shaped member 49 with inturned lips 50 and 51. A pair of stationary clamping members 52 and 53 snap under these lips and pinch opposite side portions of the tube to a greater extent than a roller 54 pinches a longitudinal central portion of the tube when the tube is partially collapsed.

The roller shown in these various embodiments preferably has a gripping surface contacting the tube causing the roller to smoothly roll along the tube, rather than sliding along the tube. A sliding motion has increased friction and also causes the tube to bulge or "bunch up" ahead of the roller. Taking, for example, the roller of the first embodiment shown in FIG. 3, there is a very special gripping surface. As best seen in FIG. 15, the roller has a generally cylindrical surface 18 with transverse V-grooves represented by 56 and 57 that interrupt less than 50% of its cylindrical clamping surface. I have found that this structure is sufficient to provide a good grip on the tube, and also gives between 2 and 5% less drift in flow rate over conventional rollers with sharp saw tooth knurling that tends to concentrate clamping forces at a series of sharp knife-like edges.

Figure 6:
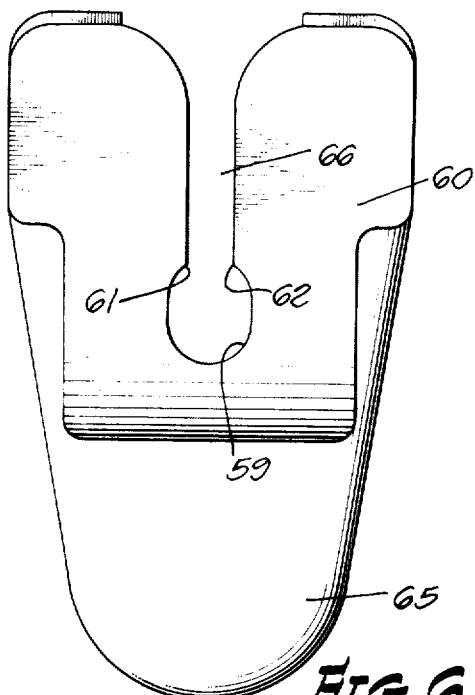
FIG. 6 is a right end view of FIG. 4 with roller and tube removed.

The clamps shown in the various embodiments can be made of rigid thermoplastic materials. I have found the body injection molded of styrene acrylonitrile (SAN) and the roller injection molded of polyacetal makes an exceptionally sturdy clamp for use on flexible thermoplastic tubing that is usually made of plasticized polyvinlychloride thermoplastic. Taking for example, the clamp body of FIGS. 1-9, the U-shaped body of SAN is sufficiently strong so the channel can be open at its top along the entire length of the clamp body and no braces are needed at 58 (FIG. 5). Such a clamp is very easy to assemble, because the tube that extends beyond both ends of the clamp can be lowered directly into the channel in a direction perpendicular to the floor when the roller is disconnected from the clamp body as shown in FIGS. 5 and 6. There is no need to thread an end of the tube between cross braces and the clamp's floor. The tube fits in tube opening 59 in a front wall 60 of the clamp and is held there by shoulders 61 and 62 adjacent the tube opening and by the roller.

The roller and clamp body have cooperating structures that hold the roller to the clamp body. In a first embodiment of this roller holding structure shown in FIGS. 4, 5, and 6, the guide slots 11 and 12 have detents 63 and 64 extending into the guide slots adjacent the rear end of the clamp body. Here, the axles of the roller snap past the detents and into the guide slots. The detents prevent the roller from accidentally slipping out of the guide slots when rolled rearwardly along the clamp body. However, with firm pressure the roller axles can be pushed past the detents 63 and 64 to disconnect the roller from the clamp body if desired.

FIGS. 16 and 17 show a second embodiment of the roller holding structure. In this embodiment, the clamp 67 has side members 68 and 69 with inner surfaces 70 and 71. There are two guide slots one of which is shown at 72. Above these guide slots are lugs 74 and 75 protruding inwardly beyond inner surfaces of the side members. These lugs have tapered lead in surfaces 76 and 77 and back stop shoulder surfaces 78 and 79. The thermoplastic roller 80 has axles 81 and 82 and a circumferential clamping surface 83. To assemble the clamp of FIGS. 16 and 17, the tube is placed in the clamp body's channel and the roller pushed against the lugs as shown in FIG. 16. Edges of the clamping surface 83, which are spaced from the axles, engage the lugs and spring the side members apart so the thermoplastic axles 81 and 82 can enter the guide slots without damage to the axles. This second embodiment of the roller holding structure is preferred, because there is less chance of marring or flattening the thermoplastic axles, which axles are critical in controlling flow rates with the clamp. This embodiment is also preferred because it is easier to injection mold lugs 74 and 75 into a one piece thermoplastic clamp body than it is to injection mold detents 63 and 64 into a similar clamp body.

When the clamp is so assembled in an administration set, as shown in FIG. 1, the nurse can regulate flow with one hand by placing the tab 65 on the bottom of the clamp between two fingers and rolling the roller along the clamp body with her thumb. If there is a need to shut off the clamp without disturbing the roller setting, this can be done by folding a portion of the tube extending from a forward end of the clamp body to form a kink and then wedging this kinked portion into slot 66 which is narrower than the tube opening and the tube's outer diameter, and thus form a secondary shut off for the clamp.

In the foregoing specification, I have used specific examples to explain my invention. However, those persons skilled in the art will understand how to make certain modifications to these examples without departing from the spirit and scope of the invention.

I claim:

1. For regulating fluid flow rates, the combination of: a resilient tube having a bore therethrough; a clamp body having front and rear ends, a longitudinal channel receiving the tube, and a floor element in the channel fitting against the tube; longitudinal guide means on the body that converges toward the floor element as it proceeds in a forward direction along the clamp body; a pressure element movable along the longitudinal guide means for progressively pinching the tube against the floor element to partially collapse the tube and regulate fluid flow through its bore; the clamp body and pressure element forming about the tube an external clamping structure that includes a pair of ledge surfaces laterally separated by a groove surface defining a longitudinal groove between the ledge surfaces; and which clamping structure pinches opposite side portions of the tube to a greater extent against the ledge surfaces than it pinches a longitudinal central portion of the tube received within the groove as the pressure element moves along the longitudinal guide means, thereby reducing flow rate drift over a period of time at a particular clamp setting.

2. The combination as set forth in claim 1, wherein the pressure element has the ledge and groove surfaces.

3. The combination as set forth in claim 1 wherein the floor element has the ledge and groove surfaces.

4. The combination as set forth in claim 3, wherein the groove surface has a pair of side walls and the ledge surfaces have inner edges that intersect these side walls, said inner edges converge toward each other as they proceed forwardly along the clamp.

5. The combination as set forth in claim 1, wherein the external clamping structure includes stationary members of the clamp body that keep the opposite side portions of the tube pinched to a greater extent than the longitudinal central portion of the tube as the pressure element moves along the guide means to progressively pinch this longitudinal central portion of the tube.

6. For use in a medical liquid administration system, the combination of: a resilient thermoplastic tube having a bore; a generally U-shaped clamp body having front and rear ends, a longitudinal channel receiving the tube, a pair of side members, and a floor element fitting against the tube and including a pair of longitudinal coplanar ledge surfaces with inner edges laterally spaced apart by a distance less than the widest dimension of the tube when totally collapsed in the channel; a groove surface including a bottom wall in the floor element and a pair of side walls that extend between the bottom wall and the inner edges of the ledge surfaces, with a longitudinal central portion of the tube fitting within a groove defined by this groove surface; a roller guide structure on the clamp body that converges toward the floor element as it proceeds in a forward direction along the clamp body; and a roller connected with the roller guide structure and adapted to move forwardly and rearwardly in the channel of the clamp body to regulate flow rates through the tube bore by pinching opposite side portions of the tube to a greater extent against the ledge surfaces than it pinches the tube's longitudinal central portion when in a partially collapsed condition, thereby reducing flow rate drift over a period of time at a particular clamp setting.

7. The combination as set forth in claim 6, wherein the inner edges of the ledge surfaces converge toward each other as they proceed forwardly along the clamp body.

8. The combination as set forth in claim 6, wherein the groove is between 0.004 and 0.020 inch deep and between 0.115 and 0.175 inch wide.

9. The combination as set forth in claim 6, wherein each ledge surface engages the tube over at least 10% of its transverse dimension when being held in a partially collapsed condition.

10. The combination as set forth in claim 6, wherein the tube bore has a generally straight transverse configuration between opposite side portions when the tube is fully collapsed and liquid flow stopped.

11. The combination as set forth in claim 6, wherein the tube in unpinched condition is generally cylindrical and the clamp body and roller are longitudinally slidable along the tube for regulating liquid flow through the tube from various locations along its length.

12. The combination as set forth in claim 6, wherein the roller has a cylindrical pressure surface with intermittant transverse grooves interrupting less than 50% of this cylindrical pressure surface to provide firm even pressure to the partially collapsed tube.

13. The combination as set forth in claim 6, wherein the clamp body has a front wall with a tube hole adjacent the floor element through which the tube extends, and this front wall has a slot narrower than the tube hole, whereby a portion of the tube can be wedged in this slot and create a secondary shut-off without disturbing the roller's flow setting in the clamp body.

14. The combination as set forth in claim 6, wherein the channel of the clamp body is open at its top along the entire length of the clamp body, whereby a tube extending beyond both ends of the clamp body can be moved in and out of the channel along a direction perpendicular to the floor element when the roller is disconnected from the clamp body.

15. The combination as set forth in claim 6, wherein the roller guide structure includes detent means for keeping the roller in the channel of the clamp body.

16. The combination as set forth in claim 6, wherein the roller guide structure includes a guide slot in each side element, and the roller includes axles that fit in these guide slots; said side members having inner surfaces facing each other, and at least one of the side members having a lug that extends inwardly beyond its inner surface; and the roller has a width at a location spaced from the axles that is greater than the channel width at the lug, and the roller at said location spaced from the axles is adapted to engage the lug to spring apart the side members to insert the axles in the guide slots without damage to the axles, after which the lug engages the roller at said roller location spaced from the axles to keep the roller in the channel of the clamp body.

17. The combination as set forth in claim 16 wherein the roller has a circumferential tube clamping surface, and the lug engages this clamping surface.

18. For use in a medical liquid administration system, the combination of: a resilient thermoplastic tube having a bore; a generally U-shaped clamp body having front and rear ends, a longitudinal channel receiving the tube, a pair of side members adjacent opposite sides of the tube, and a floor element fitting against the tube; each side member having an inner surface and a guide slot that converges toward the floor element as it proceeds forwardly along the clamp body; a thermoplastic roller fitting within the channel and having thermoplastic axles fitting in the guide slots; at least one of the side elements having a lug that extends inwardly beyond its inner surface; and the roller has a width at a location spaced from the axles that is greater than the channel width at the lug, and the roller at said location spaced from the axles is adapted to engage the lug to spring apart the side members to insert the axles in the guide slots without damage to the axles, after which the lug engages the roller at said roller location spaced from the axles to keep the roller in the channel of the clamp body.

19. A method of reducing flow rate drift while regulating flow rates through a resilient thermoplastic tube that is subject to "cold flow" when under compressive stresses comprising: positioning said tube between a pressure member that has a contact surface and a backup member that has a groove bounded by two flat ledge surfaces, each ledge surface having a width of at least 10% of the lateral tube dimension when completely collapsed, said tube being positioned to simultaneously contact both ledge surfaces while a central portion of the tube fits into said groove; and moving the contact surface of the pressure member toward and away from the backup member so as to vary the spacing between the contact surface of the pressure member and the backup member at the groove area, the movement of the pressure member between its limits of fully opened and fully closed causing a progressively increasing depression in a longitudinal direction of the thermoplastic tube wall as the tube approaches a fully closed condition, and said movement bending the thermoplastic tube wall through obtuse angles substantially greater than 90° in a longitudinal direction at all positions of the pressure member relative to the backup member to avoid permanent distortion of the thermoplastic tube beyond its recovery limits along its longitudinal dimension.

* * * * *